United States Patent

Cados

Patent Number: 6,053,094
Date of Patent: Apr. 25, 2000

[54] PITA BREAD COOKING APPARATUS

[76] Inventor: Dimitri Cados, 10 Hall Dr., Orinda, Calif. 94563

[21] Appl. No.: 09/268,772

[22] Filed: Mar. 15, 1999

[51] Int. Cl.$^7$ .............................. A47J 37/00; A47J 37/08
[52] U.S. Cl. ................................ 99/331; 99/385; 99/389; 99/448; 99/451; 99/483; 219/386; 219/400; 219/521
[58] Field of Search .................. 99/325–333, 339, 99/340, 352–355, 349, 385–389, 391, 400, 401, 444–450, 451, 483; 126/21 A, 25 A; 34/191, 196, 215; 219/400, 521, 385, 386, 476–478; 432/146, 147, 150

[56] References Cited

U.S. PATENT DOCUMENTS

| | | | |
|---|---|---|---|
| 3,501,620 | 3/1970 | Sauer | 219/400 X |
| 3,586,516 | 6/1971 | Terc | 219/400 X |
| 4,045,166 | 8/1977 | Kaleel . | |
| 4,133,336 | 1/1979 | Smith | 126/21 A |
| 4,311,088 | 1/1982 | Hohn et al. . | |
| 4,383,823 | 5/1983 | Williams et al. . | |
| 4,425,720 | 1/1984 | Elevitch | 99/450 X |
| 4,455,478 | 6/1984 | Guibert | 219/386 X |
| 4,470,805 | 9/1984 | Gollan . | |
| 5,111,012 | 5/1992 | Hyun et al. | 126/21 A |
| 5,160,829 | 11/1992 | Chang | 219/400 |
| 5,423,248 | 6/1995 | Smith et al. | 99/476 X |
| 5,458,050 | 10/1995 | Su | 99/446 X |
| 5,579,679 | 12/1996 | Hsu | 99/339 |
| 5,680,956 | 10/1997 | Woodward et al. . | |
| 5,695,668 | 12/1997 | Boddy | 99/331 X |
| 5,699,722 | 12/1997 | Erickson et al. | 99/483 X |
| 5,765,471 | 6/1998 | Monard | 99/448 |

*Primary Examiner*—Timothy Simone
*Attorney, Agent, or Firm*—Theodore J. Bielen, Jr.

[57] ABSTRACT

An Apparatus for baking pita bread dough utilizing a source of electrical power. A pair of heat resistant elements are each fitted with an electrical heating element. The pair of heat resistant elements so constructed are mated to one another to form an oven chamber. A heat conductoring screen is supported midway between the heat resistant elements within the chamber and permits cooking of the pita bread dough in uniform manner.

8 Claims, 2 Drawing Sheets

6,053,094

PITA BREAD COOKING APPARATUS

BACKGROUND OF THE INVENTION

The present invention relates to a novel and useful apparatus for baking pita bread dough.

Pocket bread, Syrian bread, Arabic bread, or pita bread are designations for a type of leavened bread which is generally baked in varying quantities. By way of illustration, the pita bread dough is formed into a flat disc approximately three to five millimeters in thickness. The pita bread dough must be cooked at a relatively high temperature, 300–450 degrees centigrade, in a relatively short time span, about one minute. The pocket is formed within the pita bread dough disc by steam that is produced and expanded internally. Thus, it is most important that the pita bread disc be cooked evenly from the top and the bottom. Failure to adhere from this criteria will produce a finished, baked, pita bread which possesses a thinner wall on one side than the other.

In the past, it has been found that home electric or gas ovens, which are commercially available, produce a poor pita bread product.

Reference is made to U.S. Pat. No. 4,383,823 which describes a radiant oven for baking loaves of bread in a continuous manner.

U.S. Pat. No. 5,680,956 shows a baking pan which is usable to produce hearth-baked texture in a pizza.

U.S. Pat. Nos. 4,045,166, 4,311,088, and 4,470,805 describe pita bread ovens of a continuous type which are unsuitable for home or personal use.

An apparatus for baking pita bread dough in a batch process would be a notable advance in the food preparation field.

SUMMARY OF THE INVENTION

In accordance with the present invention a novel and useful apparatus for baking pita bread dough utilizing a source of electrical power is herein provided.

The apparatus of the present invention employs a normal source of electrical power. A first heat resistant element is used and includes a recess. A second heat resistant element similarly configured to the first heat resistant element also includes a recess. Means for mating the first and second heat resistant elements forms a oven-like chamber to bake pita bread. The heat resistant elements may be formed of metal, ceramics and other materials, of rigid or semi-rigid configuration.

A first electrical heater is located in the recess of the first heat resistant element. Likewise, a second electrical heater is located in the recess of the second heat resistant element. Both the first and second electrical heaters derive electrical power from the electrical power source to elevate the temperature in the chamber formed by the first and second heat resistant elements to the proper level for baking, heretofore described.

A heat conductive screen is also provided in the present invention and is supported by the first heat resistant element. The heat conductive screen is located essentially equadistant from the first and second electrical heaters and may take the form of a plate generally spanning the transverse dimension of the chamber. The plate forming the heat conductive screen includes a solid surface and a plurality of openings through the plate. The plurality of openings comprise an area that is larger than the area formed by the solid surface of the plate. Since it is desirable that the heat conductive plate be thin, a plurality of bars may also be included within the chamber to support the heat conductive screen in its position between the first and second electrical heaters.

Moreover, the apparatus of the present invention may include an opening through the second heat resistant element in order to allow the escape of steam and to permit observation of the baking progress of the pita bread within the oven chamber. The opening through the second heat resistant element may be located at a position offset from the apex of the same relative its vertical axis.

Controls for the heating elements may be of conventional configuration and include a rheostat to permit accurate temperature determination within the heating chamber formed by the first and second heat resistant elements.

It may be apparent that a novel and useful apparatus for baking pita bread dough has been hereinbefore described.

It is therefore an object of the present invention to provide an apparatus for baking pita bread dough which provides uniform heating around the pita bread dough within a chamber.

Another object of the present invention is to provide an apparatus for baking pita bread dough in which a heating chamber is formed by a pair of heat resistant elements and permits the user to easily place the pita bread dough within an oven chamber and to remove the same after baking.

Another object of the present invention is to provide an apparatus for baking pita bread in which the proper temperature necessary to bake the pita bread is delivered within a short time period and distributed uniformly around the pita bread dough.

A further object of the present invention is to provide an apparatus for baking pita bread dough in which means is provided for the release of steam normally associated with baking of pita bread.

A further object of the present invention is to provide an apparatus for baking pita bread dough which delivers heat in a uniform manner about the pita bread dough and produces a baked pita bread item having an wall thickness of uniform size.

Yet another object of the present invention is to present invention is to provide an apparatus for baking pita bread dough which provides uniform heating about the pita bread dough by balancing the conduction, convection, and radiation heat generated in an oven.

The invention possesses other objects and advantages especially as concerns particular characteristics and features thereof which will become apparent as the specification continues.

BRIEF DESCRIPTION OP THE DRAWINGS

Figure 1:
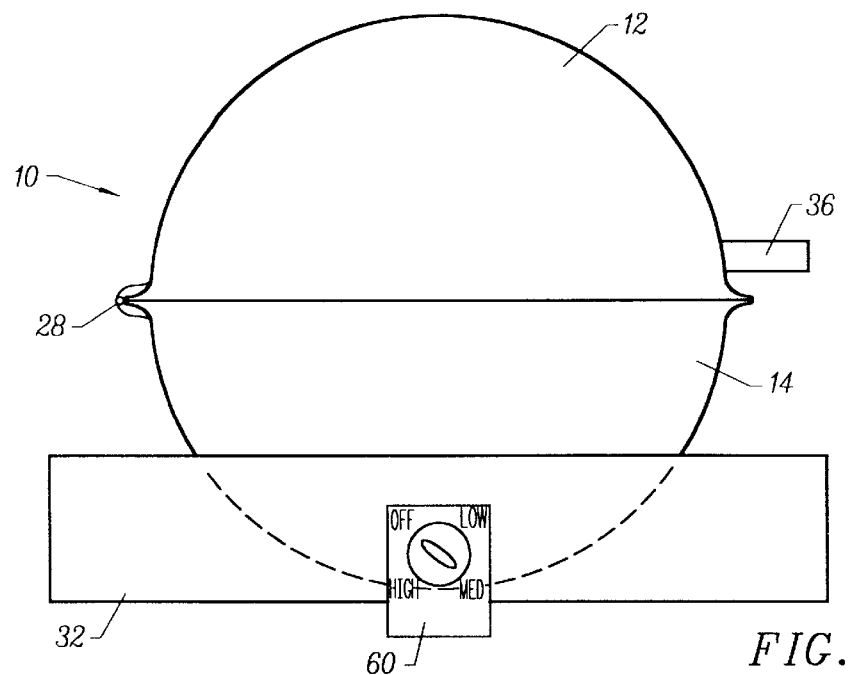
FIG. 1 is a front elevational view of the apparatus of the present invention.

For a better understanding of the invention reference is made to the following detailed description of the preferred embodiments thereof which should be taken in conjunction with the prior described drawings.

DETAILED DESCRIPTION OF THE PREFERRED EMBODIMENTS

Various aspects of the present invention will evolve from the following detailed description of the preferred embodiments thereof which should be taken in conjunction with the heretofore delineated drawings.

The invention as a whole is shown in the drawings by reference character 10. The apparatus 10 is intended to be used for baking pocket or pita bread, which is a leavened bread. Oven 10 includes as one of its portions a first heat resistant element 12 and second heat resistant element 14, in FIGS. 1 and 2. Elements 12 and 14 are generally hemispherical and include recesses 16 and 18. Means 20 is also found to permit the mating or closure of first and second elements 12 and 14 to form a oven-like chamber 22 which may be used for baking pita bread 23. Means 20 may take the form of smooth edges 24 and 26 to permit the same to rest snugly against one another. In addition, means 20 includes a hinge 28 which allows first element 12 to rotate toward or away from second element 14, as depicted by directional arrow 30. Stand 32 holds or supports apparatus 10 above a ground surface 34, such as a table top. Handle 36, formed of heat insulated material permits the user to move first element 12 according to directional arrow 30 without injuring the user of the apparatus 10.

Figure 2:
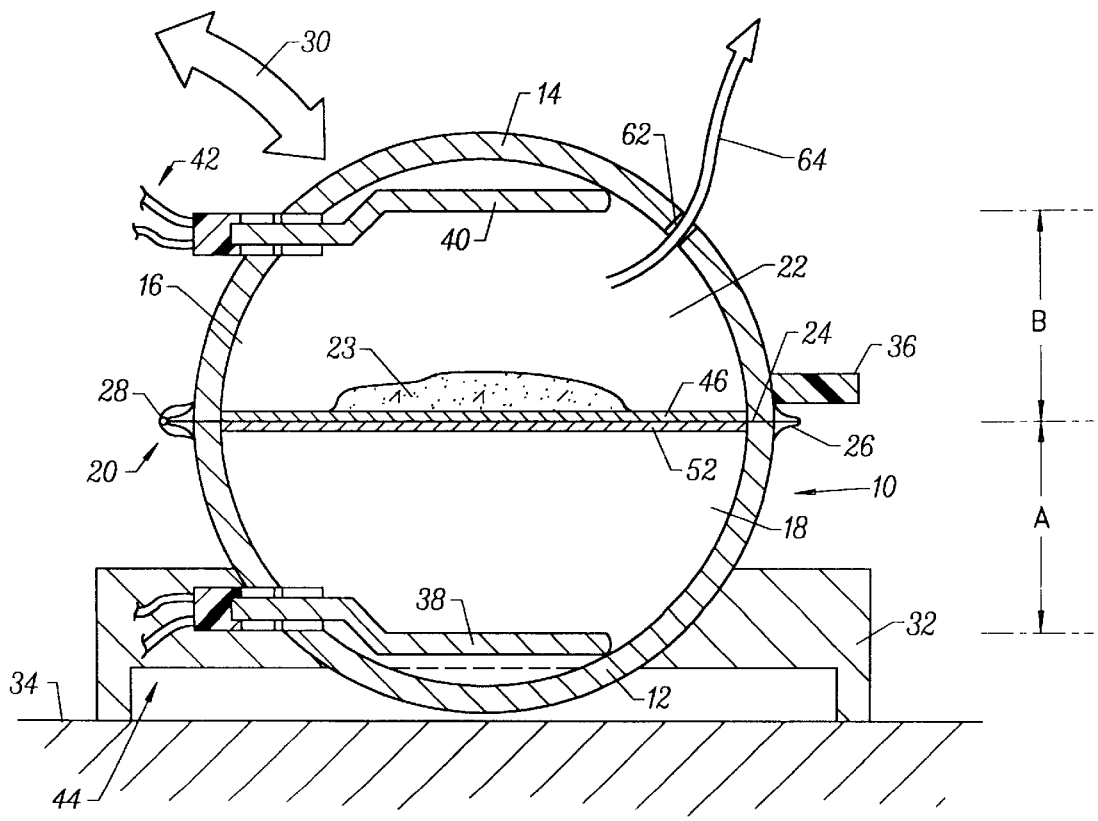
FIG. 2 is a sectional view of the apparatus depicted in FIG. 1.
Figure 3:
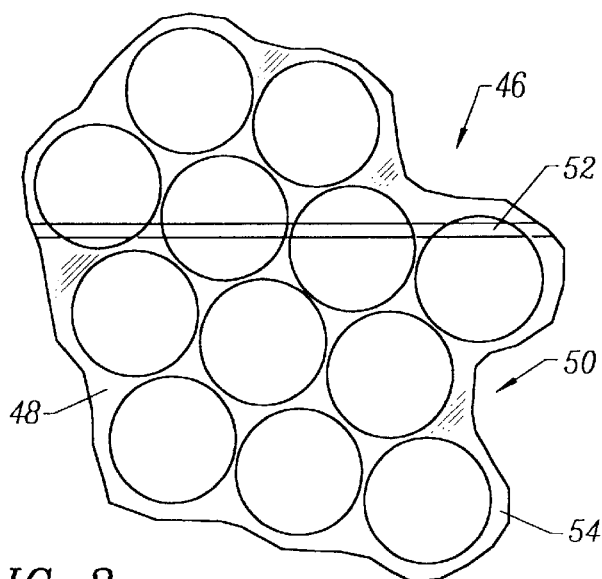
FIG. 3 is an enlarged partial top plan view of the support screen of the present invention.

With further reference to FIG. 2, it may be seen that resistance heaters 38 and 40, of conventional configuration, extend through the wall portions of first and second elements 12 and 14. Of course, heaters 38 and 40 are powered by an electrical source (not shown) which may be in the form of 120 volts AC. Plurality of conductors 42 and 44 connect to such electrical source. In addition, apparatus 10 includes a screen 46 which contacts and supports pita bread dough disc 23. Screen 46, FIG. 3, may take the form of a plate 48 having a plurality of openings therethrough. Plate 46 is quite thin and may, thus, flex to a certain degree. A plurality of bars or rods, such as exemplary bar 52, aids in the support of screen 46 in the position found in FIG. 2. It should be noted that the area of the plurality of openings 50 of screen 46 far exceeds the surface area of the plate 48 solid portion or solid lattice 54, thereof.

Figure 4:
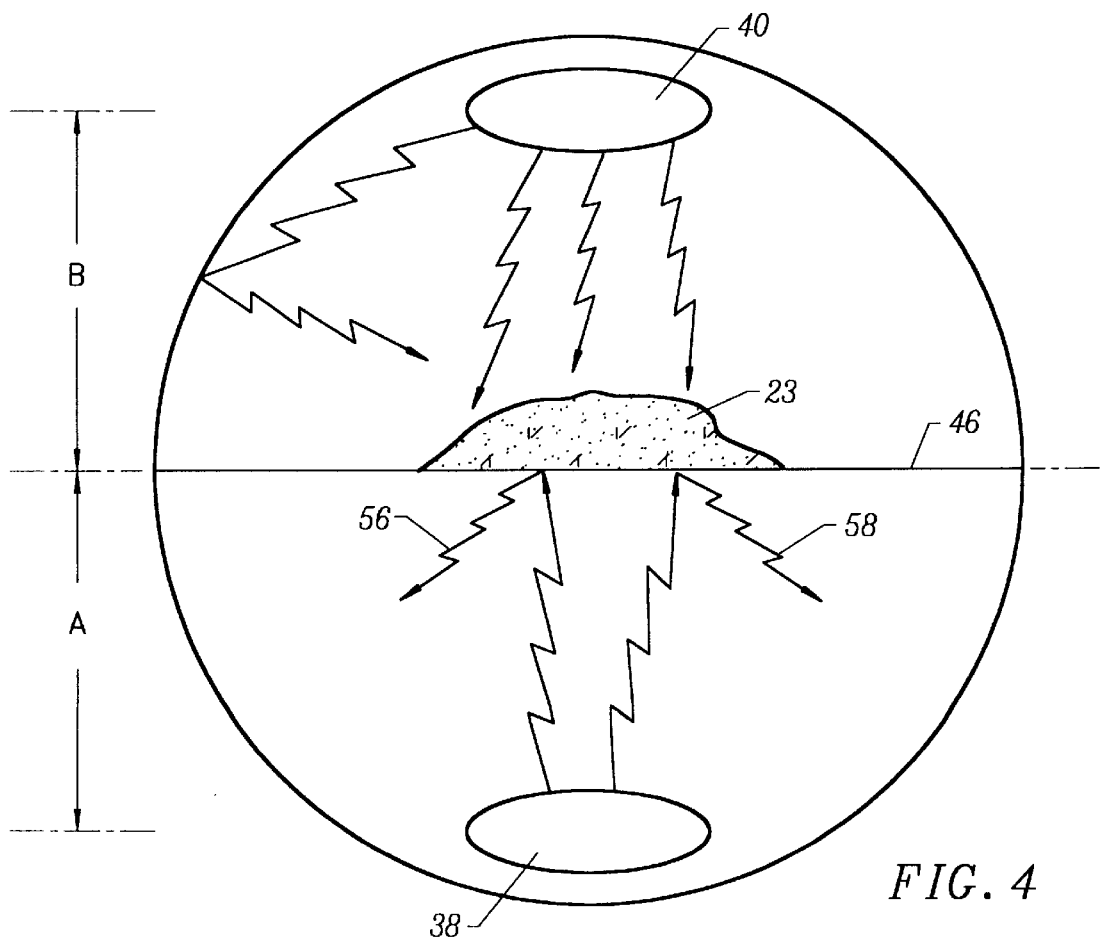
FIG. 4 is a schematic view of the apparatus of the preset invention depicting the cooking and heating process.

Returning to FIG. 2, it may be observed that screen 46 is approximately or essentially equal distance from first and second heaters 38 and 40. That is to say, distance A is essentially equal to distance B on FIG. 2. It has been found, that such a position of screen 46 permits the production of uniform heat around pita bread dough portion 23. In other words, although heaters 38 and 40 are the same distance from screen 46, heater 40 is closer to pita bread dough 23. However, heat radiating from heater 38 tends to travel upwardly toward pita bread dough portion 23. On the other hand, heat radiating downwardly from heater 40, also tends to move upwardly. Screen 46 includes large openings to permit the heat from heater 38 to bake red dough portion 23, on the other hand, heater 40 does not include the impediment of a screen for the delivery of heat therefrom to pita bread dough 23. The up-shot of this arrangement is that pita bread dough portion 23 is uniformly heated on both sides, producing excellent baking results. FIG. 4 represents, schematically the partial distribution of heat from heaters 38 and 40. It should be noted that some heat reflects back from screen 46 from heater 38, depicted by heat rays 56 and 58.

It should be noted that heaters 38 and 40 are controlled by a typical rheostat 60 shown in FIG. 1. Thus, the user of apparatus 10 may quickly and easily set the temperature within chamber 22 of apparatus 10 to produce the necessary heating level for a particular size of pita bread dough portion on disc 23. Opening 62 through second element 14 permits the user of oven apparatus 10 to view the progress of the baking of pita bread dough portion 23 within chamber 22. Also, steam, represented by directional arrow 64 is permitted to escape from oven 23, which is a normal consequence of the baking process of pita bread.

In operation, the user places a portion 23 of pita bread on screen 46 within chamber 22 formed by first and second elements 12 and 14. Control 60 is then set to the proper temperature in order to activate heaters 38 and 40 within chamber 22. Electrical conductors 42 and 44 then provide electrical power to resistance heaters 38 and 40. Heat is delivered to pita bread dough portion 23 in a uniform manner and bakes the same within one minute, in the usual course of operation. After pita bread portion 23 has been baked properly, second heat resistant element 14 is rotated away from first heat reisitant element 12 according to directional arrow 30 and the pita bread is removed from the chamber 22 for use.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An apparatus for baking a portion of pita bread dough utilizing a source of electrical power, comprising:

a. a first heat resistant element, said first heat resistant element including a recess;

b. a first electrical heater located in said recess of said first heat resistant element;

c. a second heat resistant element, said second heat resistant element including a recess;

d. a second electrical heater located in said recess of said second heat resistant element;

e. a heat conductive screen supported by said first heat resistant element for holding the pita bread dough portion; and f. means for mating said first heat resistant element to said second heat resistant element, said first and second heat resistant element recesses forming a chamber, said heat conductive screen positioned within said chamber essentially equidistant from said first and second electrical heaters.

2. The apparatus of claim 1 in which said heat conductive screen comprises a plate having a solid surface and a plurality of openings through said plate, said plurality of openings constituting a larger area than the area of said solid surface of said plate.

3. The apparatus of claim 1 in which said second heat resistant element includes an opening therethrough to said chamber.

4. The apparatus of claim 1 in which each of said first and second electrical heaters includes a heating element each located substantially the same distance from said heat conductive screen.

5. The apparatus of claim 1 in which said heat conductive screen is a flexible member and further comprises at least one bar spanning said first heat resistant element between said heat conductive screen and said first electrical heating element.

6. The apparatus of claim 5 in which said heat conductive screen comprises a plate having a solid surface and a plurality of openings through said plate, said plurality of openings constituting a larger area than the area of said solid surface of said plate.

7. The apparatus of claim 6 in which said second heat resistant element includes an opening therethrough to said chamber.

8. The apparatus of claim 7 in which each of said first and second electrical heaters includes a heating element each located substantially the same distance from said heat conductive screen.

* * * * *